(12) United States Patent
Belpaire (10) Patent No.: US 9,718,240 B2
(45) Date of Patent: Aug. 1, 2017

(54) OVERMOLDING EXTRUDED PROFILES (75) Inventor: Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 1047 days.

(21) Appl. No.: 13/700,058

(22) PCT Filed: May 25, 2011

(86) PCT No.: PCT/EP2011/058563
§ 371 (c)(1),
(2), (4) Date: Feb. 7, 2013

(87) PCT Pub. No.: WO2011/147872
PCT Pub. Date: Dec. 1, 2011

(65) Prior Publication Data
US 2013/0140731 A1 Jun. 6, 2013

(30) Foreign Application Priority Data
May 25, 2010 (EP) .................................. 10163774

(51) Int. Cl.
B29C 69/00 (2006.01)
B29C 44/18 (2006.01)
B29C 45/14 (2006.01)
B29C 47/00 (2006.01)
B29C 47/88 (2006.01)
(Continued)

(52) U.S. Cl.
CPC ............ *B29C 69/001* (2013.01); *B29C 44/18* (2013.01); *B29C 45/14221* (2013.01); *B29C 45/14336* (2013.01); *B29C 45/14795* (2013.01); *B29C 47/003* (2013.01); *B29C 47/0016* (2013.01); *B29C 47/0023* (2013.01); *B29C 47/0066* (2013.01); *B29C 47/884* (2013.01); *B62D 29/002* (2013.01); *B29C 47/0038* (2013.01); *B29C 2045/0093* (2013.01); *B29C 2793/0027* (2013.01); *B29C 2793/0063* (2013.01)

(58) Field of Classification Search
CPC ........ B29C 45/14344; B29C 45/14819; B29C 47/0066
USPC ............ 264/142, 143, 145, 148, 241, 271.1, 264/272.12, 294, 45.1, 45.9, 46.1, 46.7
See application file for complete search history.

(56) References Cited

U.S. PATENT DOCUMENTS

| 2001/0052387 A1* | 12/2001 | Kiener et al. ............... 156/272.2 |
| 2006/0073294 A1* | 4/2006 | Hutchinson ............. B29C 44/04 428/35.7 |
| 2010/0109190 A1 | 5/2010 | Hanada |

FOREIGN PATENT DOCUMENTS

| EP | 1666228 A2 | 6/2006 |
| JP | 2004255863 | * 9/2004 |

(Continued)

OTHER PUBLICATIONS

International Search Report from PCT/EP2011/058563.

*Primary Examiner* — Stella Yi
(74) *Attorney, Agent, or Firm* — Buchanan Ingersoll & Rooney PC (57) ABSTRACT

An exemplary method of, for instance, forming a baffle or reinforcer includes extruding an expandable material to have a particular cross-sectional profile, inserting the expandable material into a molding tool, cutting the expandable material to a predetermined length within the molding tool, and overmolding a carrier material onto a portion of the expandable material within the molding tool.

22 Claims, 7 Drawing Sheets (51) Int. Cl.
*B62D 29/00* (2006.01)
*B29C 45/00* (2006.01)

(56) References Cited

FOREIGN PATENT DOCUMENTS

| JP | 20044255863 | 9/2004 |
|----|----|----|
| WO | WO-2008093857 A1 | 8/2008 |

* cited by examiner

OVERMOLDING EXTRUDED PROFILES

CROSS-REFERENCE TO RELATED APPLICATIONS

This application claims priority to EP Application No. 10163774.2 filed on May 25, 2010 and International Application No. PCT/EP2011/058563 filed on May 25, 2011, the entirety of which are hereby incorporated by reference.

BACKGROUND

A baffle includes a carrier and/or fixation element and one or more thermally expandable materials designed for positioning in cavities of, for instance, automotive or aerospace beans, pillars, rails, doors, etc. to provide acoustic dampening, sealing, and/or structural reinforcement. The carrier is generally formed from plastic or metal surrounded with the expandable material. When inserted into the cavity and by the action of the heat applied in electrophoresis baking, the baffle material expands to seal the cavity and or bond the carrier to the member.

Such baffles are formed using various techniques. These techniques include overmolding the foamable material onto the carrier or assembling the separately produced foamable material and carrier using mechanical fasteners or adhesives. While each of these techniques may produce a suitable baffle, these techniques suffer from various drawbacks including high tooling costs, material shrinkage during the baking process, lack of support and sagging, etc.

JP 2004255863 discloses the extrusion of a foamed sheet and of a support layer which is overlaid in a molten state to form a planar laminate. The laminate is punched into a prescribed shape by a punching device and later a clip is bonded to the punched member. The disadvantages of this process are that several steps are needed to produce the member, that no complex shapes can be created and that a large amount of scrap is produced, this scrap is very difficult to recycle due to its two component nature.

SUMMARY

Accordingly, there is a need in the art for a new process for forming a baffle with a minimum tool investment yet produces baffles that meet acoustic, sealing, and/or structural support requirements. According to the invention, this is achieved by the features of the first claim and the further independent claim. One exemplary method includes extruding an expandable material to have a particular cross-sectional profile, inserting the expandable material into a molding tool, shaping the expandable material within the molding tool, and overmolding a carrier material onto a portion of the expandable material within the molding tool. Further advantageous embodiments of the invention emerge from the subclaims.

DETAILED DESCRIPTION

An exemplary process for forming a baffle or reinforcement includes extruding an expandable material to have a particular cross-sectional profile, inserting the expandable material into a mold, shaping the expandable material within the mold, and overmolding a carrier material onto a portion of the expandable material within the mold. Besides other advantages this process can produce baffles or reinforcements that meet acoustic, sealing, and/or structural requirements yet produce less waste and require a minimum tool investment to implement. It is especially advantageous that by the injection molding no scrap material is produced. It is further advantageous that if the extruded expandable material is cut in a special way, preferably by straight cutting, no or almost no scrap material is produced. It is further advantageous that no two or more component scrap material is produced. It is further advantageous that the process comprises cutting the expandable material to a predetermined length within the molding tool.

Figure 1:
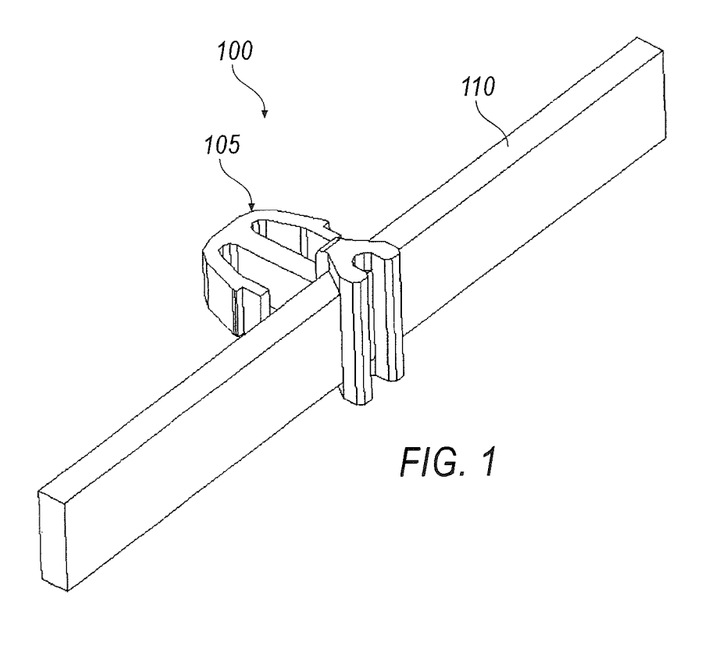
FIG. 1 illustrates an exemplary baffle with a fixation element formed from a carrier material overmolded onto a portion of an extruded expandable material.

FIG. 1 illustrates an exemplary baffle having a carrier material overmolded onto an extruded expandable material. The baffle may take many different forms and include multiple and/or alternate components and facilities. Additionally, the exemplary components illustrated throughout the figures are not intended to be limiting. Indeed, additional or alternative components and/or implementations may be used.

The baffle may be formed from any material and have a shape that generally conforms to the shape of a cavity in which the baffle may be placed. The baffle may, for instance, be disposed within a cavity having a hollow construction defined by two or more walls, such as the inside walls of a vehicle pillar. The cavity may have various cross-sectional shapes, and the baffle may be formed to generally conform to the cross-sectional shape of the cavity.

As illustrated in FIG. 1, the baffle 100 includes a carrier material 105 overmolded onto an extruded expandable material 110. The carrier material 105 may be formed from, for instance, a plastic material such as nylon or a metal. The expandable material 110 may be formed from various materials such as an acoustic foam, a structural foam, or a sealing foam. In one exemplary approach, the expandable material 110 is formed from a thermoplastic material, a rubber-based material, or an epoxy-based material. Further, the baffle 100 may have various shapes and sizes depending on the cavity where the baffle 100 is to be placed. For instance, the baffle 100 illustrated in FIG. 1 may be placed in a relatively small straight cavity, while the carriers illustrated in FIGS. 5 and 6 may be placed in larger curved cavities.

The carrier material 105 in the baffle 100 of FIG. 1 defines a fixation element that may be used to mount the baffle 100 inside a cavity. Although only one fixation element is shown, the baffle 100 may include any number of fixation elements. Moreover, the fixation element need not be located near the center of the expandable material 110. Rather, one or more fixation elements may be located near the ends of the expandable material 110.

Figure 2:
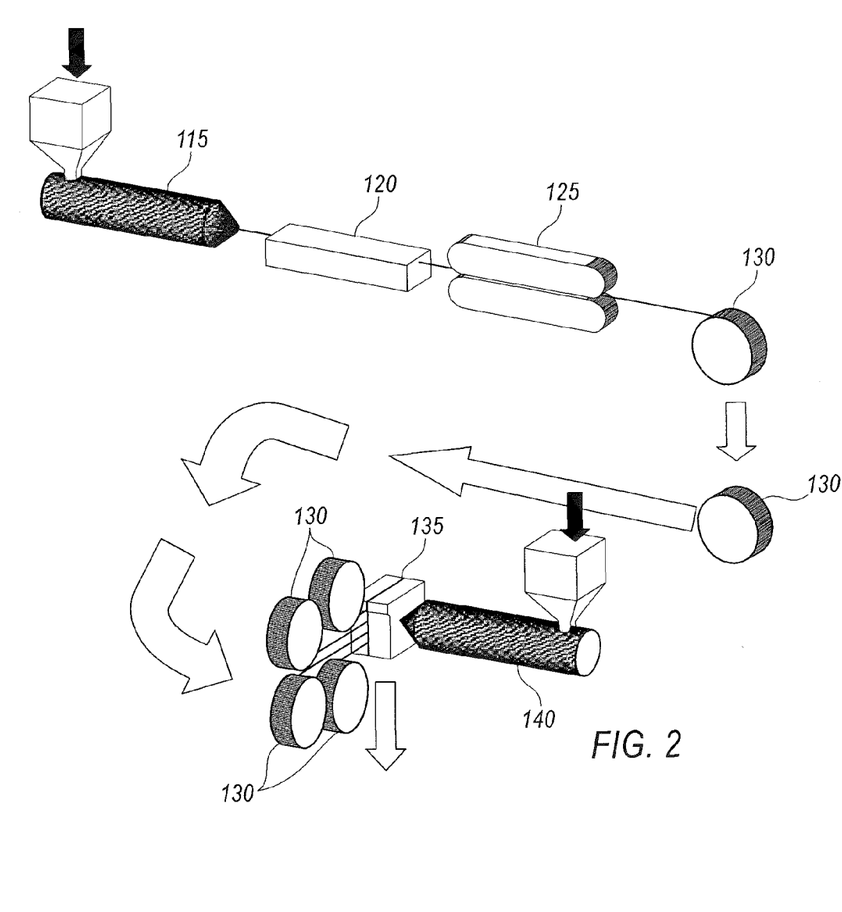
FIG. 2 illustrates exemplary components used in an exemplary process to form the exemplary baffle of FIG. 1.

FIG. 2 illustrates exemplary components that may be used to form the exemplary baffles 100 shown and described herein. The components illustrated include an extruder 115, a cooling section 120, a puller 125, a storage device 130, a molding tool 135, and an injection machine 140. In one exemplary approach, the expandable material 110, in raw form, is placed into the extruder 115. The extruder 115 may include a die that defines a desired cross-sectional shape for the expandable material 110. The expandable material 110 is pushed through the die so that the expandable material 110 has the same cross-sectional shape as defined by the die. To make it easier for the expandable material 110 to be pushed through the die, the expandable material 110 may be heated in the extruder 115.

Figure 3A:
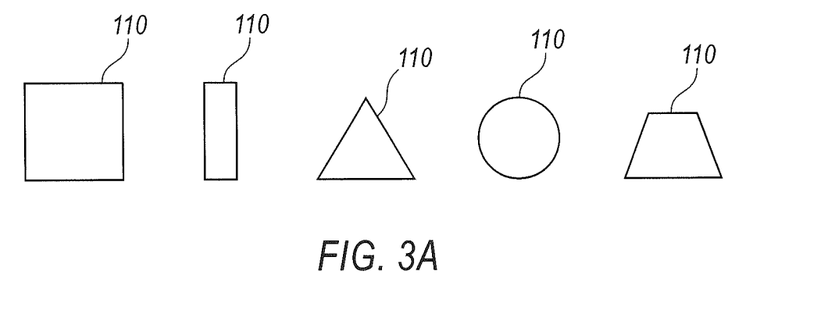
FIGS. 3A-3C illustrate exemplary cross-sectional profiles of the extruded expandable material formed with the exemplary components of FIG. 2.
Figure 3B:
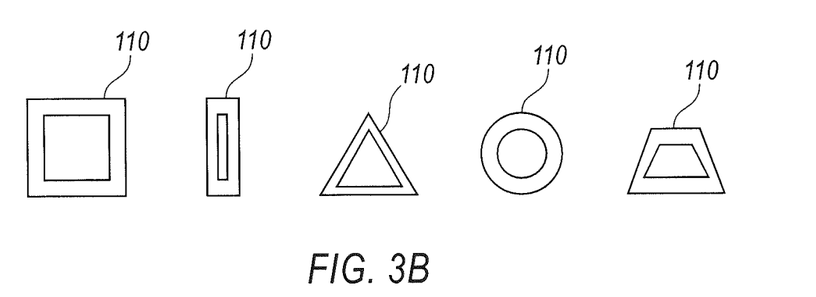
Figure 3C:
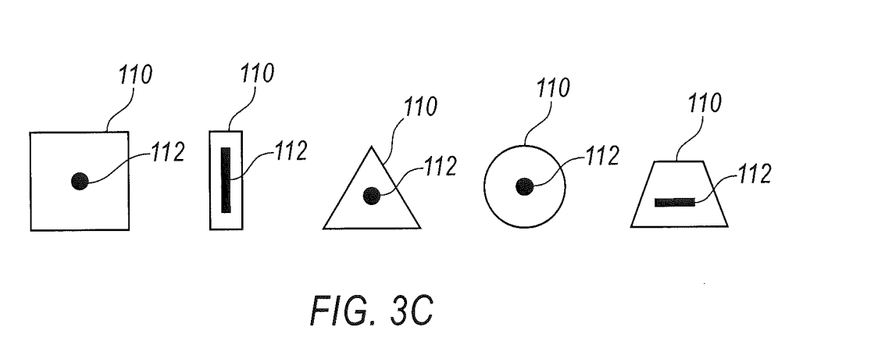

FIGS. 3A-3C illustrate exemplary cross-sectional profiles of the extruded expandable material 110 formed by the extruder 115 illustrated in FIG. 2. FIGS. 3A-3C show that the expandable material 110 may have a substantially square, rectangular, triangular, circular, or trapezoidal cross-sectional profile shape. Of course, the expandable material 110 may have a cross-sectional profile of other shapes than those illustrated. Moreover, a single baffle 100 may include expandable materials 110 with different cross-sectional profiles. In FIG. 3A, the various cross-sectional profiles of the expandable material 110 are solid. In another exemplary approach, illustrated in FIG. 3B, the cross-sectional profiles of the expandable material 110 are hollow. A hollow profile may be used to reduce costs by using less raw material when extruding the expandable material 110. In another exemplary implementation, as illustrated in FIG. 3C, a stringer 112 formed from a plastic or metal is disposed inside the expandable material 110 to provide rigidity to the expandable material 110. The stringer 112 may be used to prevent the expandable material 110 from sagging. The stringer 112 may have any cross-sectional shape that may be similar to or different than the cross-sectional profile of the expandable material 110.

Returning to FIG. 2, after the extruder 115, the expandable material 110 may be cooled at the cooling section 120. As previously discussed, the expandable material 110 may be heated prior to being pushed through the die in the extruder 115. The expandable material 110 may be cooled in the cooling section 120 to help the expandable material 110 maintain its desired shape and rigidity.

The puller 125 may be used to move the expandable material 110 from the cooling section 120 to a storage device 130 such as a drum or reel. The expandable material 110 may be stored for logistical purposes. For instance, storing the expandable material 110 allows the extruder 115 and cooling portions to be at one location (e.g., in one building) and the other components illustrated in FIG. 2 to be at another location (e.g., another building). The length of time in which the expandable material 110 may be stored depends on the shelf life of the materials that make up the expandable material 110. For instance, the expandable material 110 may be stored from 3 months to 12 months after being extruded. Additionally, the storage device 130 may allow the expandable material 110 to be inserted into the molding tool 135 from different sides. Specifically, it may be easier store the expandable material 110 in the storage device 130 and to move the storage device 130 to the appropriate location relative to the molding tool 135 than to route the expandable material 110 to different sides of the molding tool 135 directly from the cooling section 120. Of course, the expandable material 110 need not be stored in the storage device 130 prior to being inserted into the molding tool 135. Accordingly, the puller 125 may move the expandable material 110 directly into the molding tool 135.

The molding tool 135 is configured to receive the expandable material 110 after the expandable material 110 has been extruded. As previously discussed, the molding tool 135 may receive the expandable material 110 directly from the cooling section 120 or from one or more storage devices 130. In the exemplary approach illustrated in FIG. 2, the molding tool 135 receives the expandable material 110 from four storage devices 130. Although shown as being inserted into a single side, the expandable material 110 may be inserted into multiple sides of the molding tool 135. For instance, one or more storage devices 130 may feed the expandable material 110 into one side of the molding tool 135 while one or more other storage devices 130 may feed the expandable material 110 into another side of the molding tool 135.

The molding tool 135 may have various configurations, such as a two-sided configuration where each side defines part of a mold that, when the two sides are pressed together, defines the shape of the baffle 100. In one exemplary implementation, the molding tool 135 is configured to enclose at least a portion of the expandable material 110 in the mold, and the mold directs the injected carrier material 105 into the portions of the mold not containing the expandable material 110.

The carrier material 105 is injected into the molding tool 135 by the injection machine 140. For instance, the carrier material 105 may be injected into the molding tool 135 at a temperature that is above the melting temperature of the expandable material 110 to cause a partial surface melt of the portion of the expandable material 110 that comes into contact with the carrier material 105 during this overmolding process. The partial surface melt helps create a strong bond between the carrier material 105 and the expandable material 110 as the carrier material 105 cools and forms the finished baffle 100. Then, the finished baffle 100 may be ejected from the molding tool 135.

Figure 4:
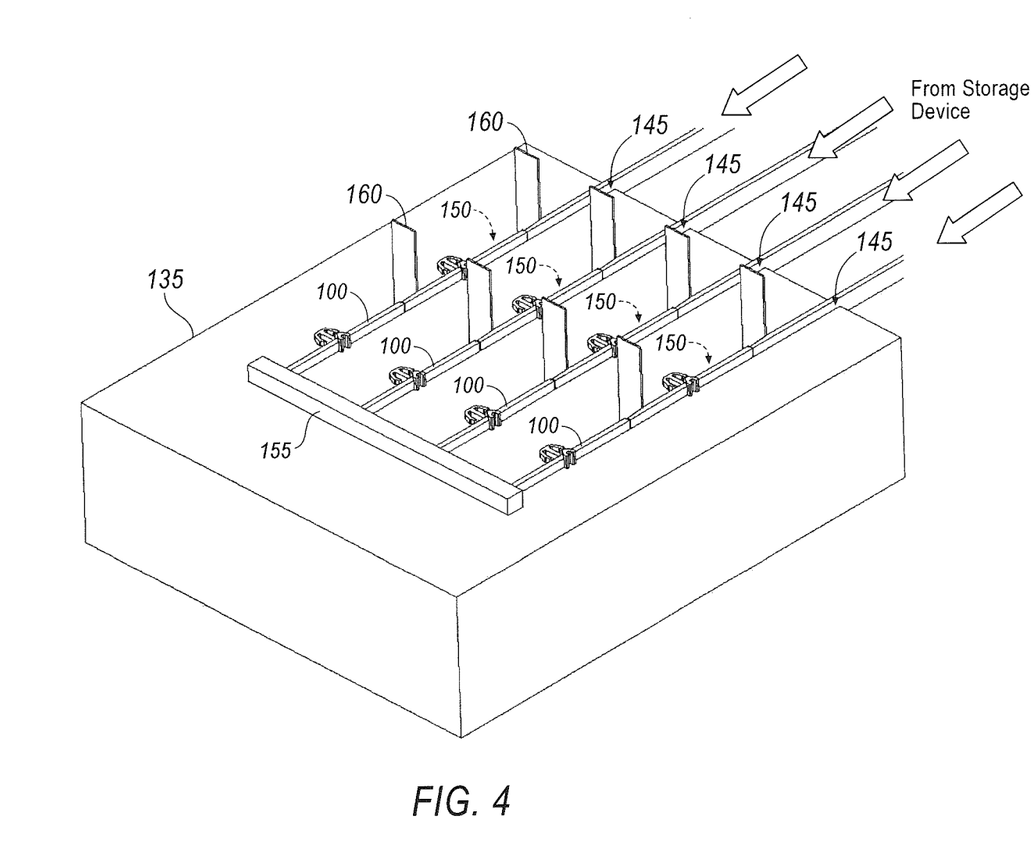
FIG. 4 illustrates one part of an exemplary two-part molding tool shown in FIG. 2.

FIG. 4 illustrates one part of the exemplary two-part molding tool 135 of FIG. 2. The molding tool 135 includes one or more openings 145 to receive the expandable material 110 from, for example, one or more of the storage devices 130. The molding tool 135 may define a channel 150 at each location in which the expandable material 110 is inserted into the molding tool 135. As illustrated in FIG. 4, four storage devices 130 insert the expandable material 110 into the molding tool 135. Accordingly, the molding tool 135 defines four channels 150. The molding tool 135 may include a stopper 155 that indicates that the channel 150 is full and that no more expandable material 110 may be inserted into the molding tool 135. The stopper 155 may include a switch that directly or indirectly prevents the storage device 130 from inserting the expandable material 110 into the molding tool 135. For example, when the expandable material 110 fills the channel 150, a small amount of pressure will be applied to the stopper 155. This pressure may cause the storage device 130 to stop inserting the expandable material 110 into the molding tool 135 via the channel 150. When room is available, in the channel 150, no pressure is applied to the stopper 155, which may cause the storage device 130 to insert more of the expandable material 110 into the molding tool 135.

The molding tool 135 further includes a cutting device 160 that is configured to cut the expandable material 110 to a predetermined length while the expandable material 110 is inside the molding tool 135. As illustrated, the cutting device 160 has an angled blade, however, the blade of the cutting device 160 may have any shape. The molding tool 135 may include any number of cutting devices 160 depending upon, for instance, the number of baffles 100 that can be simultaneously produced using the molding tool 135, the number of storage devices 130 feeding the expandable material 110 into the molding tool 135, etc. As illustrated, the molding tool 135 includes eight cutting devices 160. If the molding tool 135 has a two-part configuration that closes prior to injecting the carrier material 105, each cutting device 160 may be connected to one part of the molding tool 135 so that the act of closing the molding tool 135 cuts the expandable material 110. Alternatively, one or more of the cutting devices 160 may be separately actuated so that the cutting the expandable material 110 is independent of the act of closing the molding tool 135. Thus, the cutting device 160 may cut the expandable material 110 before or after the overmolding process.

Figure 5:
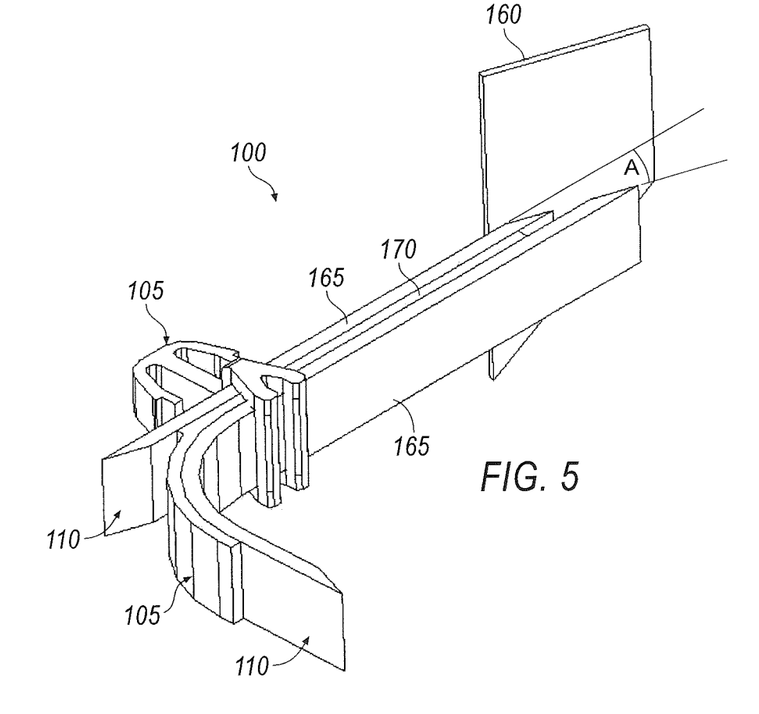
FIG. 5 illustrates another exemplary baffle produced using the exemplary components of FIG. 2.

FIG. 5 illustrates another exemplary baffle 100 that may be produced using the components of FIG. 2. The baffle 100 illustrated in FIG. 5 may be used, for instance, to fill larger cavities than the baffle 100 illustrated in FIG. 1. This exemplary baffle 100 includes two layers of the expandable material 110 spaced from one another and a layer of the carrier material 105 overmolded onto the layers of the expandable material 110. The carrier material layer 170 helps the portions of the expandable material 110 maintain a specific shape as well as forms a fixation element that may be used to attach the baffle 100 to the inside of a cavity. Of course, baffles 100 produced using the components illustrated in FIG. 2 may include any number of fixation elements, expandable material layers 165, and carrier material layers 170.

The molding tool 135 can produce baffles 100 with a custom shape to fill a specific cavity. In particular, the channels 150 in the molding tool 135 define the shapes of the expandable material layers 165 and the carrier material layer 170. One or more of the channels 150 may be curved to fit the contours of the cavity so that the baffle 100 produced by the molding tool 135 fits in the cavity. The expandable material layers 165 need not have the same shape or length as one another. As illustrated, one expandable material layer 165 is substantially straight while the other expandable material layer 165 is curved. The carrier material layer 170 in FIG. 5 between the two expandable material layers 165 helps the curved expandable material layer 165 maintain its shape. Moreover, one expandable material layer 165 may have a predefined length that is different than the length of another expandable material layer 165. Despite different lengths, the two expandable material layers 165 shown in FIG. 5 are cut using the same cutting device 160. The cutting device 160 may also cut the expandable layers at one or more specific angles A. This way, the ends of the expandable material layers 165 may be customized to fit within, for instance, cavities that are tapered at a specific angle (e.g., illustrated as angle A). Although the angles at both ends of each expandable material layer 165 are supplementary angles, another cutting device 160 may be used to cut one of the ends at a different angle so that the two angles are no longer supplementary.

Figure 6:
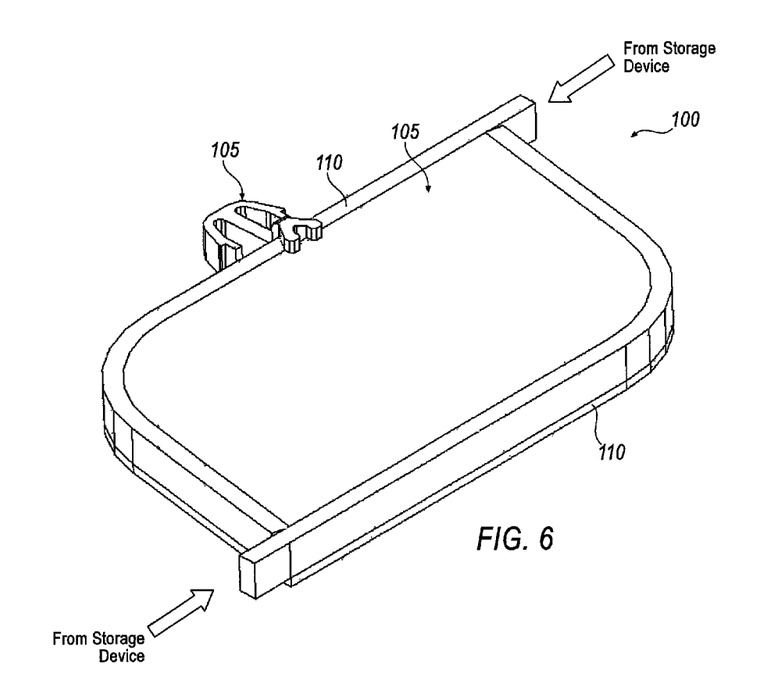
FIG. 6 illustrates yet another exemplary baffle produced using the exemplary components of FIG. 2.

FIG. 6 illustrates another exemplary baffle 100 that may be produced using the components of FIG. 2 to, for instance, fill larger cavities than the baffles 100 previously illustrated. In this exemplary baffle 100, the two layers of the expandable material 110 are inserted into the molding tool 135 from different sides via, for example, different storage devices 130. Moreover, the channels 150 defined by the molding tool 135 used to make this baffle 100 cause each expandable material layer 165 to bend in different directions to fit the contours of the cavity in which the baffle 100 is placed. The carrier material 105 is overmolded onto the expandable material layers 165 to form the fixation element and to form a substantially flat surface that at least partially fills the space between the two expandable material layers 165.

Figure 7:
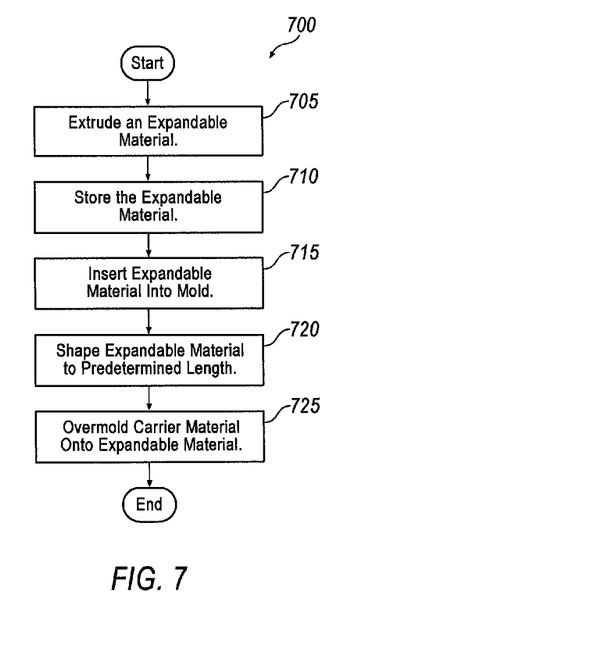
FIG. 7 is a flowchart of an exemplary method of forming a baffle or reinforcement.

FIG. 7 illustrates a flowchart of an exemplary process 700 of forming a baffle 100 or reinforcement.

Block 705 includes extruding an expandable material 110 to have a particular cross-sectional profile. For example, the extruder 115 pushes the raw expandable material 110 through a die that creates the extruded expandable material 110. The expandable material 110 may have either a hollow or solid construction following extrusion. Moreover, the expandable material 110 may be extruded with a stringer 112 to provide additional support (e.g., prevent the expandable material 110 from sagging). Furthermore, the expandable material 110 may be extruded to have a cross-sectional profile that is substantially square, substantially rectangular, substantially triangular, substantially trapezoidal, or substantially round. As mentioned above, the expandable material 110 may be heated to make extrusion easier. If so, the expandable material 110 may be passed through a cooling section 120 after being extruded. The cooling section 120 cools the expandable material 110 to help the expandable material 110 maintain its shape after being extruded.

Block 710 includes storing the expandable material 110 in one or more storage devices 130, such as reels or drums. The expandable material 110 may be stored after being cooled in the cooling section 120. The amount of time in which the expandable material 110 can be stored is dependent upon the shelf life of the materials that make up the expandable material 110.

Block 715 includes inserting the expandable material 110 into a mold. The expandable material 110 may be inserted into the molding tool 135 directly from the cooling section 120 or, alternatively, the expandable material 110 may be stored in a storage device 130 and inserted into the mold at a later time. Moreover, the expandable material 110 may be inserted into the mold from multiple storage devices 130. This may allow expandable material 110 with different cross-sectional profiles to be inserted into the molding tool 135 and/or for the expandable material 110 to be inserted into the molding tool 135 from different sides of the molding tool 135. Additionally, the expandable material 110 may be inserted into multiple channels 150 defined by the mold to form different expandable material layers 165. The channels 150 may further define the shapes of each of the layers. For instance, one channel 150 may cause one layer to be relatively linear, while another channel 150 may cause another layer to be curved.

Block 720 includes shaping the expandable material 110 within the molding tool 135. This may include bending the expandable material 110 using the channels 150 defined by the molding tool 35 and/or cutting the expandable material 110. The expandable material 110 may be cut, for instance, at the time the molding tool 135 closes. Alternatively, the expandable material 110 may be cut either before or after overmolding the carrier material 105. If the baffle 100 includes multiple layers of expandable material 110, each layer may be cut to different predetermined lengths and at specific angles.

Block 725 includes overmolding a carrier material 105 onto a portion of the expandable material 110 within the mold. For example, the carrier material 105 may be injected into the mold after the expandable material 110 is inserted into the mold. The carrier material 105 may be injected at a temperature above a melting temperature of the expandable material 110 so as to cause a partial surface melt that bonds the carrier material 105 to the expandable material 110 when cooled.

The process 700 may end after block 725 by, for instance, ejecting the finished baffle 100 from the molding tool 135.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method comprising:
    extruding an expandable material to have a particular cross-sectional profile;
    inserting the expandable material into a molding tool;
    shaping the expandable material within the molding tool; and
    overmolding a carrier material onto a portion of the expandable material within the molding tool,
    wherein the overmolding step includes injecting the carrier material into the molding tool at a temperature above a melting temperature of the expandable material,
    wherein the molding tool includes a plurality of openings for receiving the expandable material, and the expandable material is inserted into each of the plurality of openings,
    wherein the plurality of openings includes at least four openings, and wherein the expandable material is inserted into each of the at least four openings.

2. A method as set forth in claim 1, wherein the inserting step includes inserting the expandable material into a channel defined by the molding tool to form an expandable material layer.

3. A method as set forth in claim 1, wherein the shaping step includes bending the expandable material when the expandable material is inserted into a channel defined by the molding tool.

4. A method as set forth in claim 1, wherein the shaping step includes cutting the expandable material to a predetermined length within the molding tool.

5. A method as set forth in claim 4, wherein the cutting step includes cutting the expandable material at a particular angle.

6. A method as set forth in claim 1, wherein the overmolding step includes injecting the carrier material into the molding tool after the inserting step.

7. A method as set forth in claim 1, further comprising storing the expandable material in a storage device.

8. A method as set forth in claim 7, wherein the storing step includes storing the expandable material in a plurality of storage devices and wherein the inserting step includes inserting the expandable material into the molding tool from one or more of the plurality of storage devices.

9. A method as set forth in claim 1, wherein the shaping step is performed before the overmolding step.

10. A method as set forth in claim 1, wherein the shaping step is performed after the overmolding step.

11. A method as set forth in claim 1, wherein the extruding step includes forming the expandable material to have one of a solid construction and a hollow construction.

12. A method as set forth in claim 1, wherein the extruding step includes forming the expandable material to have a stringer that at least partially supports the expandable material.

13. A method as set forth in claim 1, wherein the cross-sectional profile of the extruded expandable material is at least one of a substantially square shape, a substantially rectangular shape, a substantially triangular shape, a substantially trapezoidal shape, and a substantially round shape.

14. A method comprising:
    extruding an expandable material to have a particular cross-sectional profile and a stringer embedded within the expandable material, wherein the stringer structurally supports the expandable material;
    inserting the expandable material into a channel defined by a molding tool to form an expandable material layer;
    shaping the expandable material within the molding tool according to a shape of the channels defined by the molding tool; and
    overmolding a carrier material onto a portion of the expandable material within the molding tool,
    wherein the overmolding step includes injecting the carrier material into the molding tool at a temperature above a melting temperature of the expandable material.

15. A method as set forth in claim 14, wherein the shaping step includes cutting the expandable material to a predetermined length and at a particular angle within the molding tool.

16. A method as set forth in claim 14, wherein the shaping step is performed before the overmolding step.

17. A method as set forth in claim 14, wherein the shaping step is performed after the overmolding step.

18. A method comprising:
    extruding an expandable material to have a particular cross-sectional profile and a stringer embedded within the expandable material, wherein the stringer structurally supports the expandable material;
    inserting the expandable material into a channel defined by a molding tool to form an expandable material layer by feeding the expandable material from at least one storage device to the molding tool;

shaping the expandable material within the molding tool by bending and cutting the expandable material according to a shape of the channels defined by the molding tool, wherein the expandable material is cut to a predetermined length and at a particular angle; and overmolding a carrier material onto a portion of the expandable material within the molding tool by injecting the carrier material into the molding tool at a temperature above a melting temperature of the expandable material.

19. A method as set forth in claim 18, wherein the cross-sectional profile of the extruded expandable material is at least one of a substantially square shape, a substantially rectangular shape, a substantially triangular shape, a substantially trapezoidal shape, and a substantially round shape.

20. A method as set forth in claim 1, wherein the expandable material is inserted into multiple sides of the molding tool.

21. A method as set forth in claim 1, further comprising, after the step of extruding the expandable material to have a particular cross-sectional profile and before the step of inserting the expandable material into the molding tool, storing the expandable material using a storage device, wherein the storage device is a drum or a reel.

22. A method as set forth in claim 1, wherein the extruding step includes forming the expandable material to have a solid construction that is not a hollow construction.

\* \* \* \* \*